Patented July 5, 1938

2,123,000

UNITED STATES PATENT OFFICE 2,123,000

PRODUCTION OF HYDROGEN SULPHIDE

Bernard M. Carter, Montclair, N. J., assignor to General Chemical Company, New York, N. Y., a corporation of New York No Drawing. Application July 11, 1936, Serial No. 90,179

7 Claims. (Cl. 23—181)

This application is a continuation in part of my co-pending application Serial No. 606,757, filed April 21, 1932.

This invention relates generally to the reduction of sulphur dioxide to sulphur and/or hydrogen sulphide. While the process of the application may be employed to effect production of elemental sulphur, in the preferred embodiment described and claimed herein, the invention is directed to reduction of sulphur dioxide to form hydrogen sulphide.

The principles of the invention are applicable to production of hydrogen sulphide from sulphur dioxide or gas mixtures containing the same irrespective of the source of such gases. In the more preferred forms, the invention is directed to the production of hydrogen sulphide from sulphur dioxide gas mixtures evolved in the decomposition of sulphuric acid sludges constituting waste products of numerous oil refining processes, and especially comprehends the reduction of sulphur dioxide to produce hydrogen sulphide by means of a reagent-catalyst comprising the solid carbonaceous residue also formed in the decomposition of acid sludges. The invention is further directed to methods for the recovery of sulphur values from acid sludges.

Processes for the production of hydrogen sulphide from sulphur dioxide gas mixtures by contacting the sulphur dioxide, at elevated temperatures, with carbonaceous reducing agents have heretofore been proposed. Such processes, however, comprise a reduction reaction effected at relatively high temperatures, as distinguished from the method of the present invention, according to which reduction may be readily accomplished at relatively low temperatures. Several processes have also been suggested for the recovery, from acid sludges, of sulphur as sulphur dioxide. Such latter operations involve, generally speaking, decomposition or destructive distillation of acid sludges by heating, with the evolution of gas mixtures containing sulphur dioxide, and accompanying formation of solid carbonaceous residues of varying composition.

One of the principal objects of the invention lies in the provision of a process for producing hydrogen sulphide or gas mixtures containing hydrogen sulphide in amounts predominating over other sulphurous products, from sulphur dioxide or sulphur dioxide containing gas mixtures by a reducing reaction which may be carried out at lower temperatures than heretofore. Another object contemplates the provision of a method for the reduction of sulphur dioxide to hydrogen sulphide in a reaction, involving the use of hydrocarbon reducing agents, carried out in such manner as to bring about relatively complete reduction of sulphur dioxide to hydrogen sulphide. Among other features, the invention further aims to provide a method for the recovery from acid sludges of sulphur as hydrogen sulphide. Additional objects and advantages of the invention will hereinafter appear.

I have discovered that carbonaceous residues obtained by the decomposition of acid sludges are not only superior reagent-catalysts for effecting the reduction of sulphur dioxide to produce hydrogen sulphide, but that by employing such carbonaceous residues, the reduction reaction may be efficiently initiated and carried out at temperatures substantially less than heretofore. In prior reduction methods of the general type to which the present invention relates, in the production of hydrogen sulphide the reduction reaction has been carried out at relatively high temperatures substantially in excess of 800° C. When the destructive distillation of acid sludges is permitted to proceed approximately to that point at which the acid constituents of the sludges are substantially broken up, the carbonaceous residues so obtained include appreciable quantities of volatile matter, chiefly hydrocarbons. I have also ascertained that these residues, containing volatile matter, constitute remarkably efficient reagent-catalysts for the production of hydrogen sulphide from sulphur dioxide for the reason that such residues not only act to promote the reduction reaction, but additionally serve as economical sources of reducing reagents. Although the invention contemplates utilization of the above reagent-catalysts for the reduction of sulphur dioxide irrespective of its source, in the preferred embodiment of the invention such carbonaceous residues are used for the production of hydrogen sulphide from sulphurous gas mixtures formed in the destructive distillation of acid sludges.

The preferred form of the invention comprises the reduction of sulphur dioxide to hydrogen sulphide by contacting sulphur dioxide or gas mixtures containing the same with carbonaceous residues formed by the destructive distillation of acid sludges. By virtue of my discovery of the effectiveness and reducing activity of these carbonaceous residues as reducing agents or reagent-catalysts for promoting reducing reactions, I am enabled to carry out the reduction reaction at relatively low temperatures and I am enabled to effect production of hydrogen sulphide at temperatures of the general order of or lower than temperatures heretofore necessary to carry the reduction of sulphur dioxide only to the elemental sulphur stage. In accordance with the invention, when producing hydrogen sulphide predominately, the reduction reaction is effected at temperatures not substantially in excess of 760° C., and preferably at temperatures from about 650° C. to about 735° C.

Since a particular application of the invention lies in the recovery of sulphur as hydrogen sulphide from acid sludges, one specific embodiment of the improvements constituting the invention comprises decomposing sulphuric acid sludge by heating to bring about reduction of sulphur compounds contained therein and to form a sulphur dioxide gas mixture and carbonaceous residue. The sulphur dioxide contained in the gas mixture is then reduced to hydrogen sulphide by contacting the gas mixture with carbonaceous residue so produced, the temperature of the reduction reaction being preferably maintained within the limits above noted.

The following illustrative example is given in connection with the recovery of sulphur from acid sludges.

Sulphuric acid sludges resulting from the refining of oils vary widely in composition, one representative sludge was found to have a titratable acidity of about 45% expressed as $H_2SO_4$, 37% water, and 18% hydrocarbons. Although the invention is not dependent upon any particular method for the destructive distillation of acid sludge to produce sulphur dioxide gas and carbonaceous residue, decomposition of the sludge is preferably effected by externally heating a body of sludge, in a substantially air-tight retort, at relatively low temperatures, for example from 150 to 325° C. On heating, the sulphuric acid contained in the sludge is reduced by hydrocarbons and/or by the carbonaceous matter present in the sludge, and the gas mixture evolved contains sulphur dioxide and water vapor, as the major constituents, together with smaller quantities of hydrocarbon vapors, carbon dioxide, carbon monoxide and oxygen. Preferably, decomposition of the sludge is effected at such relatively low temperatures as above noted, and under such conditions that destructive distillation proceeds only to approximately a point at which substantially all the sulphuric acid initially contained in the sludge is reduced. In this situation, the solid carbonaceous residues produced usually contain appreciable quantities of volatile matter, principally hydrocarbons, and in the case of some sludges the volatile matter content of the residue may run as high as 38–40%. I have found that this volatile matter content of the residue is particularly effective as a reducing agent in the subsequent reduction of sulphur dioxide. Accordingly, destructive distillation of the sludge is not preferably carried beyond the condition at which substantially all of the sulphuric acid is broken up.

The exit gases from the decomposing retort are cooled to say 40° C. or lower if desired, and the bulk of the water and hydrocarbon vapors are condensed, and separated from the gas stream. Since decomposition of sludge is preferably effected substantially in the absence of air or other diluting gas, the retort gas mixture after separation of water and condensable hydrocarbons, is rich in sulphur dioxide. The gas may contain 75–99% sulphur dioxide, the balance consisting chiefly of carbon dioxide and uncondensed water vapor. The amount of water vapor remaining in the gas will, of course, depend largely on the extent to which the gas is cooled to condense out the water. It is preferred, however, not to completely dry the gas, since the presence of about 4–8% by volume of water vapor in the gas stream appears advantageous in preventing formation of COS in the subsequent reduction reaction.

In accordance with this invention, the sulphur dioxide so produced is reduced to hydrogen sulphide by contacting the sulphur dioxide with solid carbonaceous residue resulting from the decomposition of acid sludge. The sulphur dioxide gas may be contacted with the carbonaceous residue in any suitable manner, for example by passing a stream of the gas through a body of the residue in a reaction chamber. The sulphur dioxide gases, if cool, are preheated to about 650° C. in any desired manner, for instance by heat exchange with hot exit gases of the reduction chamber or otherwise, and are introduced at such temperature into the reaction chamber, and passed through the body of residue therein.

Because of the catalytic properties of the carbonaceous residues, the reaction starts immediately at the relatively low temperature noted, and reduction of sulphur dioxide to hydrogen sulphide proceeds. In the preferred form of the invention, the carbonaceous residues utilized are those containing substantial amounts of volatile matter consisting chiefly of hydrocarbons. When operating with this type of residue, volatile hydrocarbons in the residue are primarily utilized in the reduction of the sulphur dioxide and it appears that the reduction takes place selectively to a substantial extent, i. e. the $SO_2$ appears to be reduced first by the volatile hydrocarbons. Hence, in accordance with a preferred modification of my invention, the reduction of the sulphur dioxide is effected substantially entirely by the volatile hydrocarbon content of the residue and when the volatile matter in the residue becomes substantially exhausted, the residual coke is removed from the reaction chamber. This mode of operation permits the economical use of the volatile matter in the residue and at the same time provides for the withdrawal of the residue from a reaction chamber at about the time available volatile matter of the residue is exhausted. The residue when withdrawn from the reaction chamber at this stage may be marketed as coke or otherwise used.

When operating with a residue which, because of the nature of the sludge from which it was obtained or because of the method of decomposition, contains but little or even no volatile matter available as a reducing agent, the residue is nevertheless an efficient reagent-catalyst for reduction of sulphur dioxide.

The invention further contemplates use of the residue from sludge decomposition as a reagent-catalyst for the reduction of sulphur dioxide in conjunction with a reducing gas such as methane, and I have found that the residue from sludge decomposition facilitates reduction of sulphur dioxide by reducing gases such as methane and causes the reaction to take place at temperatures lower than would be possible with the reducing gas alone.

The reaction involved in the present process is exothermic, and although reduction to form reaction products in which the hydrogen sulphide predominates over other sulphurous products is initiated at the low temperature of about 650° C., particularly where the concentration of the sulphur dioxide is high, relatively large quantities of heat are generated and the temperature tends to rise rapidly. To obtain best results the temperature in the reaction chamber should preferably be maintained at around 700–735° C.

I have also found that at the temperatures prevailing sulphur compounds, originating in the crude oils subjected to acid treatment and appearing in the acid sludges and in the carbonaceous residues resulting from the destructive distillation of the sludges, are decomposed in the reduction chamber, and the sulphur content of such compounds is recovered, thus increasing the sulphur recovery of the process as a whole.

Temperature control of the reaction may be had in several ways, for example by diluting the gases prior to admission to the reaction with inert gases, or by heat exchange in preheating the incoming gases, or cool sulphur dioxide gas may be introduced into the reaction chamber at an intermediate point, or provision may be made for internally or externally cooling the reaction chamber.

When so operating, the exit gases of the reaction chamber may contain hydrogen sulphide and carbon dioxide predominately, a substantial quantity of water vapor, and smaller quantities of sulphur dioxide, carbon monoxide, hydrocarbons, carbon oxysulphide, carbon bisulphide and nitrogen. To obtain maximum production of hydrogen sulphide and to recover as hydrogen sulphide the sulphur contained in the COS and $CS_2$, the exit gas of the reduction chamber may be further humidified by passing the same through water to insure presence in the gas of sufficient moisture to hydrolyze the COS and $CS_2$. The humidified gas mixture may then be passed through a catalyst chamber maintained at suitable temperature to hydrolyze the COS and $CS_2$.

Following is an illustrative example of application of the principles of the invention to production of hydrogen sulphide.

A gas mixture containing 90% sulphur dioxide, balance water vapor, hydrocarbons, $CO_2$, CO, $N_2$, was passed through a body of sludge carbonaceous residue containing about 27% volatile matter in a reduction chamber, and the temperature of the reaction was maintained at about 730° C. The exit gas of the reduction chamber analyzed substantially as follows:

|  | By volume |
|---|---|
| $H_2S$ | 26.5 |
| $SO_2$ | .2 |
| $CO_2$ | 42.0 |
| $O_2$ | .0 |
| CO | 8.0 |
| Residue ($H_2O$, hydrocarbons, COS, $CS_2$, $N_2$) | 23.5 |

To obtain maximum production of $H_2S$ and to recover as $H_2S$ sulphur contained in the COS and $CS_2$, the reduction chamber exit gas was humidified by passing the same through water at 80° C. to insure presence in the gas mixture of sufficient moisture to hydrolyze the COS and $CS_2$ contained in the reduction chamber exit gas. After humidification, the gas mixture was passed through a chamber packed with bauxite maintained at a temperature of about 650° C., and the exit gas of the bauxite chamber analyzed substantially as follows:

|  | By volume |
|---|---|
| $H_2S$ | 35.3 |
| $SO_2$ | 3.0 |
| $CO_2$ | 43.0 |
| $O_2$ | .6 |
| CO | 5.0 |
| Residue ($H_2O$, hydrocarbons, $N_2$) | 12.8 |

If it is desired to separate hydrogen sulphide from the other constituents of the exit gas of either the reduction chamber or the catalyst chamber, the gas stream may be contacted with a suitable absorbent liquid, such as dimethylaminopropanediol, adapted to selectively absorb the hydrogen sulphide which may be subsequently stripped and recovered from the absorbent as by heating.

I claim:

1. The method of producing hydrogen sulphide which comprises contacting sulphur dioxide with reagent-catalyst consisting of solid carbonaceous residue, formed by decomposing sludge material derived from sulphuric acid treatment of hydrocarbon oils and containing substantial amount of hydrogen available for combination with sulphur of the sulphur dioxide, at temperatures not less than about 650° C. and not substantially in excess of about 760° C.

2. The method of producing hydrogen sulphide which comprises contacting sulphur dioxide with reagent-catalyst consisting of solid carbonaceous residue, formed by relatively low-temperature destructive distillation of sludge material derived from sulphuric acid treatment of hydrocarbon oils and containing substantial amount of hydrogen available for combination with sulphur of the sulphur dioxide, at temperatures not less than about 650° C. and not substantially in excess of about 760° C.

3. The method of producing hydrogen sulphide which comprises contacting sulphur dioxide with reagent-catalyst consisting of solid carbonaceous residue, formed by decomposing sludge material derived from sulphuric acid treatment of hydrocarbon oils and containing substantial amount of hydrogen available for combination with sulphur of the sulphur dioxide, at temperatures not less than about 650° C. and not substantially in excess of about 735° C.

4. The method of continuously producing hydrogen sulphide which comprises passing a stream of sulphur dioxide containing no substantial amount of oxygen in contact with reagent-catalyst consisting of solid carbonaceous residue, formed by decomposing sludge material derived from sulphuric acid treatment of hydrocarbon oils and containing substantial amount of hydrogen available for combination with sulphur of the sulphur dioxide, at temperatures not less than about 650° C. and not substantially in excess of about 760° C., maintaining such temperatures solely by heat generated by the reaction, and recovering hydrogen sulphide.

5. The method of producing hydrogen sulphide which comprises contacting sulphur dioxide with reagent-catalyst consisting of solid carbonaceous residue, formed by decomposing sludge material derived from sulphuric acid treatment of hydrocarbon oils and containing hydrogen in amount sufficient to effect formation of the major portion of the hydrogen sulphide produced, at temperatures not less than about 650° C. and not substantially in excess of about 760° C.

6. The method of continuously producing hydrogen sulphide which comprises passing a stream of sulphur dioxide containing no substantial amount of oxygen in contact with reagent-catalyst consisting of solid carbonaceous residue, formed by decomposing sludge material derived from sulphuric acid treatment of hydrocarbon oils and containing hydrogen in amount sufficient to effect formation of the major portion of the hydrogen sulphide produced, at temperatures not less than about 650° C. and not substantially in excess of about 760° C., maintaining such temperatures solely by heat generated by the reaction, and recovering hydrogen sulphide.

7. The method of producing hydrogen sulphide which comprises decomposing sludge material, derived from sulphuric acid treatment of hydrocarbon oils, by heating substantially in the absence of oxygen to temperatures of not more than about 325° C. to produce sulphur dioxide gas containing no substantial amount of oxygen and to produce solid carbonaceous residue containing hydrogen available for combination with sulphur of the sulphur dioxide, contacting the sulphur dioxide with such solid carbonaceous residue, containing hydrogen in amount sufficient to effect formation of the major portion of the hydrogen sulphide produced, at temperatures not less than about 650° C. and not substantially in excess of about 760° C., maintaining such temperatures solely by heat generated by the hydrogen sulphide formation reaction, and recovering hydrogen sulphide.

BERNARD M. CARTER.